(12) United States Patent
Saito

(10) Patent No.: US 12,214,618 B2
(45) Date of Patent: Feb. 4, 2025

(54) TRANSFER SHEET

(71) Applicant: AICELLO CORPORATION, Toyohashi (JP)

(72) Inventor: Shigenori Saito, Toyohashi (JP)

(73) Assignee: AICELLO CORPORATION, Toyohashi (JP)

( * ) Notice: Subject to any disclaimer, the term of this patent is extended or adjusted under 35 U.S.C. 154(b) by 729 days.

(21) Appl. No.: 17/617,234

(22) PCT Filed: Jul. 3, 2020

(86) PCT No.: PCT/JP2020/026116
§ 371 (c)(1),
(2) Date: Dec. 7, 2021

(87) PCT Pub. No.: WO2021/002446
PCT Pub. Date: Jan. 7, 2021

(65) Prior Publication Data
US 2022/0234383 A1 Jul. 28, 2022

(30) Foreign Application Priority Data
Jul. 4, 2019 (JP) ................. 2019-125282

(51) Int. Cl.
*B44C 1/17* (2006.01)
*C08J 7/04* (2020.01)
*C08L 29/04* (2006.01)

(52) U.S. Cl.
CPC ............ *B44C 1/1708* (2013.01); *C08J 7/042* (2013.01); *C08L 29/04* (2013.01); *C08J 2329/04* (2013.01); *C08J 2333/04* (2013.01)

(58) Field of Classification Search
CPC ...... B44C 1/1708; B44C 1/165; B41M 5/508; B32B 37/003; B32B 37/025; B32B 27/08;
(Continued)

(56) References Cited

U.S. PATENT DOCUMENTS 4,469,837 A * 9/1984 Cattaneo ............... C08K 5/053
524/557
6,410,200 B1 * 6/2002 Williams .............. B44C 1/1708
428/32.81
(Continued)

FOREIGN PATENT DOCUMENTS

CN 101432661 A 5/2009
CN 106394047 A 2/2017
(Continued)

OTHER PUBLICATIONS

A First Office Action issued by the State Intellectual Property Office of China on Jan. 19, 2023, for Chinese counterpart application No. 202080043643.8 (6 pages).
(Continued)

*Primary Examiner* — Kevin R Kruer
(74) *Attorney, Agent, or Firm* — Law Office of Katsuhiro Arai

(57) ABSTRACT

A transfer sheet has a structure in which a polyester layer as a backing layer, a polyvinyl alcohol (PVA) layer, and a transfer layer, are stacked in this order, where the polyvinyl alcohol layer contains a diol compound and/or triol compound whose adjacent hydroxyl groups are positioned at δ or farther positions with respect to each other, and which satisfies the condition in (i): (i) a T-peel strength at a peel rate of 100 mm/min between the polyester layer and the polyvinyl alcohol layer before a transfer layer is formed but after a humidity has been adjusted in an environment of 23° C., 50% RH, is 30 mN/20 mm or greater. The transfer sheet is intended to offer a single-sheet solution for achieving both normal temperature transfer and thermal transfer when transferring a material having high adhesion to polyester or other material constituting the backing.

16 Claims, 1 Drawing Sheet

(58) Field of Classification Search
CPC ......... B32B 7/06; B32B 27/306; B32B 27/36; B32B 37/04; B32B 37/26; C08J 7/042; C08J 2329/04; C08J 2333/04; C08L 29/04; C08L 71/02; C08K 5/053

See application file for complete search history.

(56) References Cited

U.S. PATENT DOCUMENTS

| | | | | |
|---|---|---|---|---|
| 9,087,640 | B2* | 7/2015 | Sugawara | H01B 1/127 |
| 2006/0205862 | A1* | 9/2006 | Muller | C08L 23/10 |
| | | | | 524/524 |
| 2016/0067997 | A1* | 3/2016 | Oomura | B32B 27/30 |
| | | | | 428/32.52 |
| 2017/0081442 | A1* | 3/2017 | Johnson | B29C 48/345 |
| 2018/0251613 | A1* | 9/2018 | Hiura | B29B 7/88 |
| 2020/0047418 | A1* | 2/2020 | Kumaki | B29C 64/40 |
| 2020/0199314 | A1* | 6/2020 | Hiura | C11D 17/043 |
| 2022/0002532 | A1* | 1/2022 | Williams | C08F 116/06 |
| 2022/0234383 | A1* | 7/2022 | Saito | C08J 7/042 |
| 2023/0092120 | A1* | 3/2023 | Ota | C08L 3/08 |
| | | | | 524/50 |
| 2023/0174765 | A1* | 6/2023 | Ikubo | B32B 27/08 |
| | | | | 525/57 |
| 2023/0235166 | A1* | 7/2023 | Bewsher | C08K 5/092 |
| | | | | 427/389.9 |
| 2023/0257535 | A1* | 8/2023 | Okamoto | B65D 65/46 |
| | | | | 524/503 |
| 2023/0323046 | A1* | 10/2023 | Kazeto | C08J 5/18 |
| | | | | 524/503 |
| 2023/0331930 | A1* | 10/2023 | Tansho | C08L 29/04 |
| 2024/0247114 | A1* | 7/2024 | Clark | C11D 17/043 |
| 2024/0270912 | A1* | 8/2024 | Stern | C08L 29/04 |
| 2024/0353294 | A1* | 10/2024 | Revol-Cavalier | C08K 3/16 |

FOREIGN PATENT DOCUMENTS

| | | |
|---|---|---|
| CN | 109863024 A | 6/2019 |
| JP | H10166793 A | 6/1998 |
| JP | WO2007125992 A1 | 9/2009 |
| JP | 2012027357 A | 2/2012 |
| JP | 2014077121 A | 5/2014 |
| JP | 2017128127 A | 7/2017 |
| JP | 2018149814 A | 9/2018 |
| TW | 200809415 A | 2/2008 |
| WO | 2007125992 A1 | 11/2007 |

OTHER PUBLICATIONS

An Office Action with a Search Report issued by Taiwan Intellectual Property Office, mailed Mar. 11, 2024, for Taiwan counterpart application No. 109122397. (7 pages).

International Search Report (ISR) mailed Sep. 15, 2020, issued for International application No. PCT/JP2020/026116. (2 pages).

* cited by examiner

[FIG. 1]
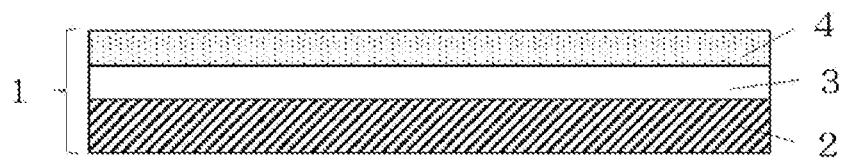
[FIG. 2]
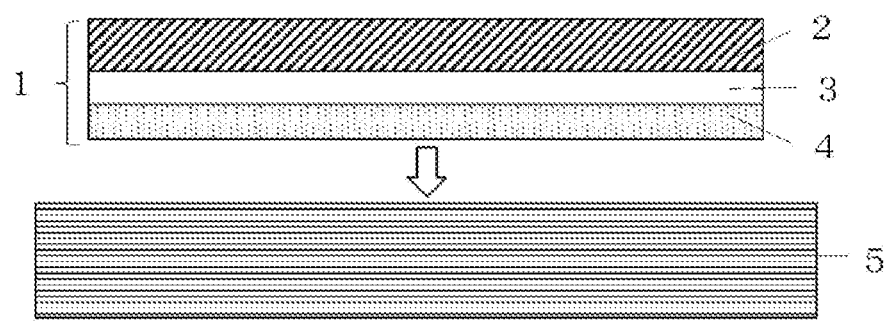
[FIG. 3]
[FIG. 4]
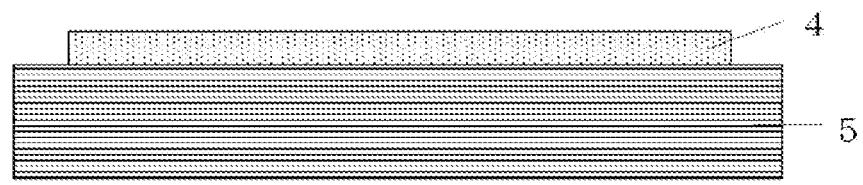

TRANSFER SHEET

CROSS-REFERENCE TO RELATED APPLICATIONS

This application is the U.S. National Phase under 35 U.S.C. § 371 of International Application PCT/JP2020/026116, filed Jul. 3, 2020, which claims priority to Japanese Patent Application No. JP2019-125282, filed Jul. 4, 2019. The International Application was published under PCT Article 21 (2) in a language other than English.

TECHNICAL FIELD

The present invention relates to a transfer sheet made of photoresist or other curable resin, metal film, inorganic oxide, or other material which has high adhesion to polyester or other material constituting a backing and does not release easily in thermal transfer, etc.

BACKGROUND ART

In the field of surface decoration of molded products, an art of forming a decorative layer on a backing layer on which a release layer has been formed, so that the decorative layer will be peeled from the release layer and transferred onto the surface of a target object by means of heating, application of pressure, etc., is known, as described in Patent Literature 1. Also in use is an art of forming a decorative layer on a water-soluble base material, so that by swelling the base material at the water surface and swelling the decorative layer with a solvent, the decorative layer will be transferred onto a target object by means of water pressure.

However, transferring metal films and certain resins, etc., is difficult with this hydraulic transfer.

It also requires the target object and decorative layer to be water-resistant, which makes it difficult to transfer target objects and decorative layers that are made of wide-ranging materials.

Other known transfer means include normal temperature transfer and thermal transfer; however, these transfers are used independently of each other, requiring transfer sheets of normal temperature transfer type and thermal transfer type, respectively.

As a result, no transfer sheets are available yet that offer a single-sheet solution for achieving normal temperature transfer in some cases and thermal transfer in others.

As for thermal transfer sheets, only the type comprising a base material sheet, a primer layer made of water-soluble polyvinyl alcohol provided thereon, and a transfer layer provided on the primer layer, is known, like the thermal transfer sheet described in Patent Literature 2, wherein the base material sheet is peeled, and the primer layer and transfer layer are removed by washing with water after the transfer.

BACKGROUND ART LITERATURE

Patent Literature

Patent Literature 1: Japanese Patent Laid-open No. 2014-077121

Patent Literature 2: Japanese Patent Laid-open No. Hei 10-166793

SUMMARY OF THE INVENTION

Problems to be Solved by the Invention

Recent years have seen the need to transfer not only decorations, but also fine wiring patterns, metal films, inorganic oxide films, functional resin films, and other functions, where it is possible that the target substrates onto which these functions have been transferred undergo further processes of etching, sputtering, vapor deposition, coating, surface working, cutting, bonding, etc.

Many of these layers having functions (transfer materials) have high adhesion to transfer sheets. Accordingly, release layers appropriate for transfer materials must be provided to ensure smooth transfer. Additionally, since some transfer materials cannot demonstrate their prescribed functions for reasons such as changing properties when heated, it is desired that a single type of transfer sheet be used to achieve transfer at wide-ranging temperatures according to the type of the transfer material and that of the substrate onto which it is to be transferred.

At the time of transfer, it must be bonded to the substrate, together with a backing layer, so as to prevent the swelling/shrinking of the polyvinyl alcohol (PVA) layer caused by humidity in the air, and also prevent deforming of the transfer layer due to the conditions under which the substrate is bonded, or to address the need to temporarily store the substrate that has been bonded to the transfer target.

In addition, if the substrate of the transfer target is flexible, a rolled substrate is unrolled and the transfer sheet is bonded to the surface of the unrolled substrate, while at the same time the backing of the transfer sheet is peeled, and then the transferred PVA layer is dissolved in water to cause the transfer layer to be transferred onto the substrate surface. And, in some cases, a continuous transfer process of roll-to-roll method is implemented, wherein the substrate having the transfer layer on its surface is rolled up. With either the sheet-fed method or roll-to-roll method, it is important, in achieving transfer without damaging the transfer layer, to peel only the backing layer from the substrate surface of the transfer target in a clean manner without leaving peel marks, etc., after the transfer sheet has been bonded.

Furthermore, dissolving the PVA layer in water and thereby forming a transfer layer on the substrate surface without leaving wrinkle marks and bubble marks requires that any partial peeling be prevented between the backing layer and the PVA layer and between the PVA layer and the transfer layer in the process of producing a transfer layer on the PVA layer beforehand or in the process of bonding it to the substrate surface of the transfer target. Solving these problems has heretofore been difficult. Accordingly, the present invention aims to solve these problems.

Means for Solving the Problems

After studying in earnest to solve the aforementioned problems, the inventor of the present invention found that they could be solved by the following means, which led to the present invention:

1. A transfer sheet which has a structure in which a polyester layer as a backing layer, a polyvinyl alcohol (PVA) layer, and a transfer layer, are stacked in this order, where the polyvinyl alcohol layer contains a diol compound and/or triol compound whose adjacent hydroxyl groups are positioned at δ or farther positions with respect to each other, and which satisfies the condition in (i) below:
(i) the T-peel strength at a peel rate of 100 mm/min between the polyester layer and the polyvinyl alcohol layer before a transfer layer is formed but after the humidity has been adjusted in an environment of 23° C., 50% RH, is 30 mN/20 mm or greater.
2. The transfer sheet according to 1, wherein the polyester layer is not release-treated.
3. The transfer sheet according to 1 or 2, wherein the diol compound is a polyalkylene glycol of 1000 or greater in number-average molecular weight.
4. A transfer method that comprises:
bonding the transfer layer side of the transfer sheet according to any one of 1 to 3 onto the surface of a flat or three-dimensionally shaped substrate;
then peeling the polyester layer; and
subsequently dissolving the polyvinyl alcohol layer in water and thus removing it, to form a transfer layer on the substrate surface.

Effects of the Invention

The transfer sheet proposed by the present invention, by having as a backing layer a polyester layer whose peel strength with respect to a polyvinyl alcohol (hereinafter sometimes referred to as "PVA") layer is in an appropriate range, allows a transfer layer to be formed without wrinkles on the PVA layer formed on the polyester layer, and can also be stored without damaging the transfer layer because bubbles do not enter between the polyester layer and the PVA layer.

Since the polyester layer can be peeled easily after the transfer sheet proposed by the present invention is bonded to the surface of the substrate of the transfer target, the PVA layer and transfer layer will not be damaged. Accordingly, the transfer layer can be transferred onto the substrate surface with certainty by dissolving the PVA layer in water.

It should be noted that, even if the PVA layer and transfer layer cannot be peeled at the substrate surface of the transfer target, the transfer layer can still be left on the substrate, that is, transfer can still be achieved, by dissolving the PVA layer in water to remove it. This eliminates the need to select and adopt a release layer according to the material of the transfer layer, and prevents release layer components from mixing into the transfer layer.

Also, after the transfer sheet proposed by the present invention has been bonded to the substrate, the transfer sheet/substrate can be stored in a bonded state because the PVA layer no longer peels from the transfer layer. Additionally, when a light-absorbing agent is contained in the PVA layer, optical damage to the transfer layer can be prevented. Furthermore, by utilizing a laser beam appropriate for the wavelength of the light-absorbing agent, cutting, surface working, etc., can be performed prior to dissolving the PVA layer in water.

BRIEF DESCRIPTION OF THE DRAWINGS

FIG. 1 Transfer sheet proposed by the present invention
FIG. 2 Substrate having the transfer sheet bonded to it
FIG. 3 Figure showing the transfer sheet whose polyester layer has been peeled off
FIG. 4 Figure of the substrate onto which the transfer sheet has been transferred by dissolving the PVA layer in water

DESCRIPTION OF THE SYMBOLS

1: Transfer sheet proposed by the present invention
2: Polyester layer
3: Polyvinyl alcohol layer
4: Transfer layer
5: Substrate

MODE FOR CARRYING OUT THE INVENTION

Preferred modes for carrying out the present invention are explained below; it should be noted, however, that the scope of the present invention is not limited by these modes.

As shown in FIG. 1, the transfer sheet 1 proposed by the present invention is a laminate comprising, in this order, a polyester layer 2 as a backing layer, a polyvinyl alcohol layer 3, and a transfer layer 4.

Using this transfer sheet 1, its surface on transfer layer 4 side is adhered/bonded to a substrate 5, being a transfer target, by means of heating, application of pressure, vacuum, compressed air, pressing force, etc., as shown in FIG. 2, after which the polyester layer 2 is peeled.

In the resulting state, the substrate 5, transfer layer 4 and polyvinyl alcohol layer 3 are stacked in this order, as shown in FIG. 3.

Next, the polyvinyl alcohol layer 3 is dissolved and removed using cold water or warm water, so that only the transfer layer 4 can be transferred onto the substrate 5 to obtain the substrate 5 having the transfer layer 4 formed on its surface, as shown in FIG. 4.

The transfer sheet 1 proposed by the present invention is explained below.
<Transfer Sheet>
(Polyester Layer)

The polyester layer 2 used in the transfer sheet 1 proposed by the present invention is a backing layer, which is a layer that, via the polyvinyl alcohol layer 3 stacked thereon with an appropriate peel strength, retains the transfer layer 4 and is peeled from the polyvinyl alcohol layer 3 in the transfer process. As a result, the transfer layer 4 can be adhered to the surface of the transfer target substrate 5 accurately without generating wrinkles.

Such polyester layer may be a sheet of polyethylene terephthalate (PET), polybutylene terephthalate (PBT), polyethylene naphthalate (PEN), etc.

Also, while the polyester layer surface may have been release-treated (hydrophobized) or hydrophilized by corona discharge treatment or other known means, an untreated surface that has not been release-treated or hydrophilized is preferred.

If the polyester layer surface is release-treated with silicone, fluorine, etc., its peel strength with respect to the polyvinyl alcohol layer 3 may become too low and the polyvinyl alcohol layer 3 may peel partially from the polyester layer 2 due to heating, application of pressure, etc., in the process of producing the transfer layer 4. As a result, bubbles may collect between the polyester layer 2 and the polyvinyl alcohol layer 3 and bubble marks may be transferred onto the transfer layer 4, possibly degrading its appearance after the transfer. Also, a trace amount of silicone or other component of release treatment agent may mix into the transfer layer 4, possibly impacting the post-transfer processes adversely or creating problems regarding the device performance of the transfer target substrate 5.

If the polyester layer 2 is given corona discharge treatment or other hydrophilizing treatment and the peel strength is unnecessarily high, peeling it from the polyvinyl alcohol layer 3 may become difficult, in which case the transfer layer could be damaged.

For such polyester layer 2, any commercial polyester film may be used, such as Emblet S (manufactured by Unitika Ltd., untreated PET), Toyobo Ester Film (manufactured by Toyobo Co., Ltd., untreated PET), Teonex (manufactured by Teijin Limited, PEN), etc., for example.

Under the present invention, adopting a polyester layer 2 without surface treatment means that the polyester layer 2 has not been treated to make its surface hydrophilic or hydrophobic. It also means that the layer has not been treated in a manner affecting the hydrophilicity or hydrophobicity of its surface by blending an additive, etc., in the polyester layer 2 or modifying the polyester resin itself.

It should be noted that, so long as the effects of the present invention are demonstrated, giving some degree of treatment to improve hydrophobicity or hydrophilicity as mentioned above is not precluded.

The polyester layer 2 may be stretched or non-stretched. Preferably its thickness is 10 to 188 μm. If it is under 10 μm, providing an initial peel point from which to start peeling the polyester layer 2 may become difficult, while if it exceeds 188 μm, it may result in the rigidity of the polyester layer 2 to be so high as to worsen the workability of peeling.

It should be noted that although it is possible to create irregularities on the surface on polyvinyl alcohol layer 3 side by blending in a filler or roughening the surface, such irregularities must be provided to the extent that they will not reduce the peel property of the polyester layer 2 nor will they form irregularities also on the polyvinyl alcohol layer 3 surface in a manner reflecting the roughened surface.

(Polyvinyl Alcohol Layer)

In the transfer sheet 1 proposed by the present invention, the polyvinyl alcohol (PVA) resin used for the polyvinyl alcohol layer 3 has a saponification degree of preferably 60% by mol or higher, or more preferably 70 to 95% by mol. If the saponification degree is under 60% by mol, the PVA layer may not be fully dissolved in water (removed by dissolution in water) in the transfer process, possibly creating problems in subsequent processes.

This PVA resin may be modified and/or unmodified. If modified, it may be copolymerized with other monomers in the main chain to the extent that the effects of the present invention are not inhibited, such as by a range of 10% by mol or lower or preferably 7% by mol or lower.

Such monomers include, for example, ethylene, propylene, isobutylene, α-octene, α-dodecene, α-octadecene, and other olefins, acrylic acid, methacrylic acid, crotonic acid, maleic acid, maleic acid anhydride, itaconic acid and other unsaturated acids or salts thereof or mono-or di-alkyl esters thereof, acrylonitrile, methacrylonitrile and other nitriles, acrylamide, methacrylamide and other amides, ethylene sulfonic acid, allyl sulfonic acid, methallyl sulfonic acid and other olefin sulfonic acids or salts thereof, alkyl vinyl ethers, polyoxyethylene (meth) allyl ether, polyoxypropylene (meth) allyl ether and other polyoxyalkylene (meth) allyl ethers, polyoxyethylene (meth) acrylate, polyoxypropylene (meth) acrylate and other polyoxyalkylene (meth) acrylates, polyoxyethylene (meth) acrylamide, polyoxypropylene (meth) acrylamide and other polyoxyalkylene (meth) acrylamides, polyoxyethylene (1-(meth) acrylamide-1,1-dimethylpropyl) ester, polyoxyethylene vinyl ether, polyoxypropylene vinyl ether, polyoxyethylene allylamine, polyoxypropylene allylamine, polyoxyethylene vinylamine, polyoxypropylene vinylamine, diacetone acrylamide, N-acrylamide methyl trimethyl ammonium chloride, allyl trimethyl ammonium chloride, dimethyl diallyl ammonium chloride, dimethyl allyl vinyl ketone, N-vinyl pyrrolidone, vinyl chloride, vinylidene chloride, etc. Any of these other monomers may be used alone, or multiples of them may be combined.

The polyvinyl alcohol layer 3 must contain at least one type of diol compound and/or triol compound whose adjacent hydroxyl groups are positioned at δ or farther positions with respect to each other.

So that transfer will progress smoothly, the diol compound has a number-average molecular weight of preferably 400 or greater, or more preferably 800 or greater, or yet more preferably 1000 or greater. Also, it is preferably a polyalkylene glycol of 20000 or smaller in number-average molecular weight.

Also, most preferably a polyalkylene glycol of 1000 or greater in number-average molecular weight, and a triol compound whose adjacent hydroxyl groups are positioned at δ or farther positions with respect to each other, are both contained. In this case, more ideally the polyalkylene glycol of 1000 or greater in number-average molecular weight and triol compound whose adjacent hydroxyl groups are positioned at δ or farther positions with respect to each other are contained at a weight ratio of 1:9 to 9:1.

Here, the triol compound whose adjacent hydroxyl groups are positioned at δ or farther positions with respect to each other is a compound that has three hydroxyl groups and that, regardless of which of these hydroxyl groups is used as reference and when the carbon element bonded to it represents the α position, has four or more carbon, oxygen, or other atoms of 2 or greater in atomic value bonded at the shortest lengths between the reference hydroxyl group and the remaining two hydroxyl groups. And, in all combinations of two arbitrary hydroxyl groups among the three hydroxyl groups, four or more atoms of 2 or greater in atomic values must be bonded between them.

For example, in the 1,4,8-octanetriol shown in Chem. 1 below, where the hydroxyl group bonded to the carbon atom at the fourth position is used as reference, the hydroxyl groups at the first and eighth positions adjacent to it represent the δ position and ε position, respectively. Similarly, in the oxyethylene glyceryl ether shown in Chem. 2 below, where the hydroxyl group positioned in the middle of the molecule is used as reference, the adjacent hydroxyl groups are positioned at θ positions, respectively.

Under the present invention, a triol compound whose adjacent hydroxyl groups are positioned at δ or farther positions with respect to each other is a compound where all hydroxyl groups in the triol compound are positioned at δ positions or farther away with respect to one another.

Like the 1,2,8-octanetriol shown in Chem. 3 below, a compound whose two adjacent hydroxyl groups are spaced apart by being positioned at δ or farther positions with respect to each other but whose other pair of two adjacent hydroxyl groups are positioned at γ or closer positions with respect to each other, is not a triol compound whose adjacent hydroxyl groups are positioned at δ or farther positions with respect to each other under the present invention.

[Chem. 1]

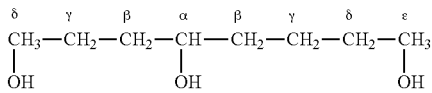

-continued

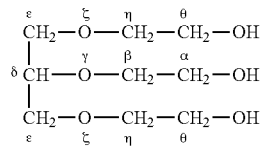
[Chem. 2]

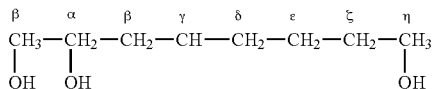
[Chem. 3]

Also, the diol compound, and the triol compound whose adjacent hydroxyl groups are positioned at δ or farther positions with respect to each other, are added, in total, preferably by 1 part by weight or more, or more preferably 1 to 20 parts by weight, or yet more preferably 1 to 15 parts by weight, or most preferably 3 to 12 parts by weight, relative to 100 parts by weight of the polyvinyl alcohol resin.

Furthermore, preferably the diol compound is added by 1 part by weight or more, or more preferably 1 to 15 parts by weight, or yet more preferably 1 to 10 parts by weight, or most preferably 3 to 10 parts by weight, relative to 100 parts by weight of the polyvinyl alcohol resin.

Also, preferably the triol compound whose adjacent hydroxyl groups are positioned at δ or farther positions with respect to each other is added by 1 part by weight or more, or more preferably 1 to 18 parts by weight, or yet more preferably 1 to 13 parts by weight, or most preferably 3 to 10 parts by weight, relative to 100 parts by weight of the polyvinyl alcohol resin.

If a triol compound whose adjacent hydroxyl groups are present at the α position, β position, or γ position from each other or polyalcohol compound with hydroxyl groups having a valency of 4 or greater is contained, peeling the polyester layer 2 after substrate 5 bonding in the transfer process may become so difficult as to leave peel marks, possibly damaging the transfer layer 4.

Also, the T-peel strength at a peel rate of 100 mm/min between the polyester layer 2 and the polyvinyl alcohol layer 3 before a transfer layer is formed but after the humidity has been adjusted in an environment of 23° C., 50% RH, must be 30 mN/20 mm or greater, and it is preferably 30 to 400 mN/20 mm, or more preferably 30 to 300 mN/20 mm, or yet more preferably 40 to 100 mN/20 mm, or most preferably 45 to 70 mN/20 mm.

If the T-peel strength is under 30 mN/20 mm, the polyvinyl alcohol layer 3 will partially peel from the polyester layer 2 due to heating, application of pressure, etc., in the process of forming a transfer layer 4 on the polyvinyl alcohol layer 3, and bubbles will collect as a result. These bubbles may be transferred onto the transfer layer 4, possibly degrading its appearance. If the T-peel strength exceeds 400 mN/20 mm, creating an initial peel point may become difficult when peeling the polyester layer after substrate 5 bonding in the transfer process. Also, if the T-peel strength exceeds 300 mN/20 mm, creating an initial peel point may become difficult in some cases.

The diol compound in the present invention must be soluble in water and may be ethylene glycol, trimethylene glycol, 1,4-butanediol, 1,3-butylene glycol, 1,5-pentanediol, 1,2-hexanediol, 1,6-hexanediol, 2-methylpentane-2,4-diol, polyethylene glycol, polypropylene glycol, ethylene glycol-propylene glycol copolymer, propylene glycol-butylene glycol copolymer, ethylene glycol-propylene glycol-butylene glycol terpolymer, etc.

Additionally, the triol compound whose adjacent hydroxyl groups are positioned at δ or farther positions with respect to each other in the present invention must also be soluble in water. This compound may be triethylolpropane, polyoxyethylene glyceryl ether, polyoxypropylene glyceryl ether, diglycerin monoalkylate, etc.

The means for providing the polyvinyl alcohol layer is not limited in any way, and it may be provided using a solution obtained by dissolving a composition of polyvinyl alcohol layer 3 in a solvent which is then applied/dried by common means, or a polyvinyl alcohol layer 3 formed on a separately prepared peelable film may be transferred onto the polyester layer 2 by any known means.

The thickness of the polyvinyl alcohol layer 3 is 5 to 100 μm.

A light-absorbing agent may be added to the polyvinyl alcohol layer 3, as necessary, to add lightfastness and laser beam absorption property. To add light-absorption property covering a UV range of 300 to 400 nm in wavelength, for example, any of benzotriazol-based compounds, triazine-based compounds, benzophenone-based compounds, benzoate-based compounds, hindered amine-based compounds, etc., may be added, such as ADEKA NOL UC (manufactured by ADEKA Corporation), Newcoat UVA (manufactured by Shin-Nakamura Chemical Co., Ltd.), etc., for example. To add light-absorption property covering a near-infrared range of 1,100 nm in wavelength, any of diimmonium salt compounds, aminium salt compounds, etc., may be added, such as NIR-IM1 (manufactured by Nagase ChemteX Corporation), etc., for example.

A defoaming agent may be added to the polyvinyl alcohol layer 3 for the purpose of preventing foaming while the layer is dissolved in water in the transfer process. Preferably the defoaming agent is non-silicone-based, such as SN-DE-FOAMER (manufactured by San Nopco Limited), SY-Glyster (manufactured by Sakamoto Yakuhin Kogyo Co., Ltd.), etc., for example.

Such polyvinyl alcohol layer 3 can be manufactured by coating an aqueous PVA solution on the polyester layer 2 using a slot die, etc., and then drying the solution.

The polyvinyl alcohol layer 3 can be colored by adding known dyes and pigments for the purpose of shielding light and to indicate presence/absence of the polyvinyl alcohol resin before/after it is removed with water. Preferably these dyes and pigments are of water-soluble or water-dispersible type, such as Blue No. 1, Yellow No. 4 and other food dyes, titanium oxide, etc., for example.

(Transfer Layer)

For the transfer layer 4 in the transfer sheet 1 proposed by the present invention, any of thermoplastic resins, curable resins, metal films, inorganic oxide films, and other known transferable materials that can be formed on the polyvinyl alcohol layer 3 may be used.

Such materials include, for example, photocurable resins such as epoxy-based or other negative resists, novolac-naphthoquinonediazide-based or other positive resists, polyhydroxystyrene-based or other chemically-amplified resists, and other photocurable resin compositions, various print layers, silicon dioxide ($SiO_2$), indium tin oxide (ITO), and other metal oxides and other inorganic compounds, copper, gold, and other metals.

The transfer layer 4 may be produced according to a method appropriate for the material of the transfer layer 4, such as coating, sputtering, vapor-depositing, bonding, transferring, etc., onto the polyvinyl alcohol layer 3. Also, a bonding layer or adhesive layer may be provided, or a silane coupling agent, etc., may be coated, on the transfer layer 4 surface to improve adhesion to the substrate 5 surface of the transfer target.

Additionally, a cover film may be provided on the surface of the transfer layer 4 for the purpose of preventing damage to or soiling of the transfer layer 4 during storage.

(Substrate)

The substrate 5 is the target onto which to transfer the transfer layer 4, and it may be either flat or three-dimensionally shaped and can be constituted by plastic molded body, glass, ceramic, metal, semiconductor, rubber, etc. To increase adhesion to the transfer layer, it can be provided with a bonding/adhesive layer or coated with a silane coupling agent, etc.

EXAMPLES

The present invention is explained more specifically below using Examples. It should be noted that the Examples represent only some modes of the present invention and the present invention is not limited by these Examples.
<Production of Transfer Sheet 1>

Example 1

As a backing layer, a polyethylene terephthalate (PET) film with untreated surface (manufactured by Unitika Ltd., untreated SD-75, thickness 75 μm) was used.

On the backing layer, a polyvinyl alcohol layer was produced to a dry thickness of 15 μm by bar-coating using an aqueous solution of a resin composition constituted by the following at the following ratios: 100 parts by weight of polyvinyl alcohol (PVA) (manufactured by Japan Vam & Poval Co., Ltd., PXP-05, saponification degree 88% by mol, polymerization degree 600), 9 parts by weight of polyethylene glycol (PEG) 1540 (number-average molecular weight 1540) as a diol compound, and 1 part by weight of polyoxypropylene glyceryl ether 300 (the polyoxypropylene chain is bonded to all three hydroxyl groups of glycerin (same applies hereinafter), number-average molecular weight 300) as a triol compound whose adjacent hydroxyl groups are positioned at δ or farther positions with respect to each other.

Thereafter, photocurable resin AZ1500 (manufactured by Clariant AG, novolac resin-based) was coated, as a transfer layer, on the polyvinyl alcohol layer to a dry thickness of 3 μm by bar-coating, and then dried for 5 minutes at 90° C., after which ultraviolet ray was irradiated at an exposure amount of 300 mJ, to produce a transfer sheet.

Example 2

A transfer sheet was produced according to the same method as in Example 1, except that a polyvinyl alcohol layer was obtained from an aqueous solution of a resin composition constituted by the following at the following ratios: 100 parts by weight of PVA (manufactured by Japan Vam & Poval Co., Ltd., PXP-05, saponification degree 88% by mol, polymerization degree 600), 1 part by weight of PEG 1540 as a diol compound, and 9 parts by weight of polyoxypropylene glyceryl ether 300 as a triol compound whose adjacent hydroxyl groups are positioned at δ or farther positions with respect to each other.

Example 3

As a backing layer, a PET film with untreated surface (manufactured by Unitika Ltd., untreated SD-75, thickness 75 μm) was used.

On the backing layer, a polyvinyl alcohol layer was produced to a dry thickness of 15 μm by bar-coating using an aqueous solution of a resin composition constituted by the following at the following ratios: 100 parts by weight of PVA (manufactured by Japan Vam & Poval Co., Ltd., JR-05, saponification degree 70% by mol, polymerization degree 600), 5 parts by weight of PEG 1540 as a diol compound, and 5 parts by weight of polyoxypropylene glyceryl ether 300 as a triol compound whose adjacent hydroxyl groups are positioned at δ or farther positions with respect to each other.

Thereafter, a transfer layer was formed on the polyvinyl alcohol layer in the same manner as in Example 1, to produce a transfer sheet.

Example 4

As a backing layer, a PET film with untreated surface (manufactured by Unitika Ltd., untreated S-50, thickness 50 μm) was used.

On the backing layer, a polyvinyl alcohol layer was produced to a dry thickness of 15 μm by bar-coating using an aqueous solution of a resin composition constituted by the following at the following ratios: 100 parts by weight of PVA (manufactured by Japan Vam & Poval Co., Ltd., JP-10, saponification degree 88% by mol, polymerization degree 1000), 5 parts by weight of PEG 1540 as a diol compound, and 5 parts by weight of polyoxypropylene glyceryl ether 300 as a triol compound whose adjacent hydroxyl groups are positioned at δ or farther positions with respect to each other.

Thereafter, a Cr film (1000 Å) was produced as a transfer layer on the polyvinyl alcohol layer according to the sputtering method, after which an adhesive resin (acrylic resin, manufactured by DIC Corporation, ACRYDIC A-811-BE) was coated on the Cr film by bar-coating to a dry thickness of 3 μm, and then dried for 5 minutes at 80° C., to produce a transfer sheet.

Example 5

A transfer sheet was produced according to the same method as in Example 4, except that a corona-discharge-treated PET film (manufactured by Unitika Ltd., one-side-treated SD-75, thickness 75 μm) was used as a backing layer.

Example 6

As a backing layer, a PET film with untreated surface (manufactured by Unitika Ltd., untreated S-38, thickness 38 μm) was used.

On the backing layer, a polyvinyl alcohol layer was produced to a dry thickness of 15 μm by bar-coating using an aqueous solution of a resin composition constituted by the following at the following ratios: 100 parts by weight of PVA (manufactured by Japan Vam & Poval Co., Ltd., JP-15, saponification degree 88% by mol, polymerization degree 1500) and 5 parts by weight of PEG 400 (polyethylene glycol, number-average molecular weight 400) as a diol compound.

Thereafter, a thermoplastic resin (urethane resin, manufactured by Toyo Ink Co., Ltd., LIOALPHA S) was coated, as a transfer layer, on the polyvinyl alcohol layer to a dry thickness of 3 µm by bar-coating, and then dried for 5 minutes at 80° C., to produce a transfer sheet.

Example 7

A transfer sheet was produced according to the same method as in Example 6, except that the diol compound was changed to 5 parts by weight of PEG 1000 (polyethylene glycol, number-average molecular weight 1000).

Example 8

A transfer sheet was produced according to the same method as in Example 6, except that the diol compound was changed to 5 parts by weight of trimethylene glycol.

Example 9

A transfer sheet was produced according to the same method as in Example 6, except that the diol compound was changed to 5 parts by weight of 2-methylpentane-2,4-diol.

Example 10

As a backing layer, a PET film with untreated surface (manufactured by Unitika Ltd., untreated SD-75, thickness 75 µm) was used.

On the backing layer, a polyvinyl alcohol layer was produced to a dry thickness of 15 µm by bar-coating using an aqueous solution of a resin composition constituted by the following at the following ratios: 100 parts by weight of PVA (manufactured by Japan Vam & Poval Co., Ltd., JP-05, saponification degree 88% by mol, polymerization degree 600) and 15 parts by weight of polyoxypropylene glyceryl ether 300 as a triol compound whose adjacent hydroxyl groups are positioned at & or farther positions with respect to each other.

Thereafter, a transfer layer was formed on the polyvinyl alcohol layer in the same manner as in Example 1, to produce a transfer sheet.

Example 11

A transfer sheet was produced according to the same method as in Example 10, except that PVA of 70% by mol in saponification degree (manufactured by Japan Vam & Poval Co., Ltd., JR-05, polymerization degree 600) was used.

Example 12

As a backing layer, a PET film with untreated surface (manufactured by Unitika Ltd., untreated SD-75, thickness 75 µm) was used.

On the backing layer, a polyvinyl alcohol layer was produced to a dry thickness of 15 µm by bar-coating using an aqueous solution of a resin composition constituted by the following at the following ratios: 100 parts by weight of PVA (manufactured by Japan Vam & Poval Co., Ltd., JR-05, saponification degree 70% by mol, polymerization degree 600) and 10 parts by weight of PEG 1540 as a diol compound.

Thereafter, a transfer layer was formed on the polyvinyl alcohol layer in the same manner as in Example 1, to produce a transfer sheet.

Example 13

A transfer sheet was produced according to the same method as in Example 12, except that PEG 6000 (polyethylene glycol, number-average molecular weight 6000) was used as a diol compound.

Comparative Example 1

As a backing layer, a PET film with untreated surface (manufactured by Unitika Ltd., SD-75, thickness 75 µm) was used.

On the backing layer, a polyvinyl alcohol layer was produced to a dry thickness of 15 µm by bar-coating using an aqueous solution of a resin composition constituted by the following at the following ratios: 100 parts by weight of PVA (manufactured by Japan Vam & Poval Co., Ltd., JP-10, saponification degree 88% by mol, polymerization degree 1000) and 5 parts by weight of glycerin as a triol compound whose adjacent hydroxyl groups are positioned at ß positions with respect to each other.

Thereafter, a transfer layer was formed on the polyvinyl alcohol layer in the same manner as in Example 1, to produce a transfer sheet.

Comparative Example 2

A transfer sheet was produced according to Comparative Example 1 by using 5 parts by weight of trimethylolpropane as a triol compound whose adjacent hydroxyl groups are positioned at γ positions with respect to each other, instead of the triol compound whose adjacent hydroxyl groups are positioned at ß positions with respect to each other.

Comparative Example 3

A transfer sheet was produced according to Comparative Example 1 by using 5 parts by weight of 1,2,6-hexanetriol as a triol compound whose adjacent hydroxyl groups are positioned at ε position and ß position with respect to each other, instead of the triol compound whose adjacent hydroxyl groups are positioned at ß positions with respect to each other.

Comparative Example 4

A transfer sheet was produced according to Comparative Example 1 by using 5 parts by weight of diglycerin as a tetraol compound, instead of the triol compound whose adjacent hydroxyl groups are positioned at ß positions with respect to each other.

Comparative Example 5

A transfer sheet was produced according to Comparative Example 1 by using 5 parts by weight of polyoxyethylene glyceryl ether (number-average molecular weight 450) as a tetraol compound, instead of the triol compound whose adjacent hydroxyl groups are positioned at ß positions with respect to each other.

Comparative Example 6

A transfer sheet was produced according to Comparative Example 1 by using 5 parts by weight of sorbitol as a hexol compound, instead of the triol compound whose adjacent hydroxyl groups are positioned at ß positions with respect to each other.

Comparative Example 7

A transfer sheet was produced according to Comparative Example 1 by using 10 parts by weight of polypropylene glycol (PPG) 400 (number-average molecular weight 400) as a diol compound, instead of the triol compound whose adjacent hydroxyl groups are positioned at ß positions with respect to each other.

Comparative Example 8

As a backing layer, a PET film with untreated surface (manufactured by Unitika Ltd., untreated SD-75, thickness 75 μm) was used.

On the backing layer, a PVA layer was produced to a dry thickness of 15 μm by bar-coating using an aqueous solution of PVA (manufactured by Japan Vam & Poval Co., Ltd., JP-10, saponification degree 88% by mol, polymerization degree 1000).

Thereafter, a transfer layer was formed on the polyvinyl alcohol layer in the same manner as in Example 1, to produce a transfer sheet.

Comparative Example 9

A transfer sheet was produced according to the same method as in Comparative Example 8, except that a release-treated PET film (manufactured by Unitika Ltd., FT-50, thickness 50 μm) was used as a backing layer.

Comparative Example 10

A transfer sheet was produced according to the same method as in Comparative Example 8, except that a corona-discharge-treated PET film (manufactured by Unitika Ltd., one-side-treated SD-75, thickness 75 μm) was used as a backing layer.

Comparative Example 11

A transfer sheet was produced according to the same method as in Comparative Example 8, except that a corona-discharge-treated polypropylene film (manufactured by Futamura Chemical Co., Ltd., FOH, thickness 50 μm) was used as a backing layer.

Comparative Example 12

As a backing layer, a release-treated PET film (manufactured by Unitika Ltd., FT-50, thickness 50 μm) was used.

On the backing layer, a polyvinyl alcohol layer was produced to a dry thickness of 15 μm by bar-coating using an aqueous solution of a resin composition constituted by the following at the following ratios: 100 parts by weight of PVA (manufactured by Japan Vam & Poval Co., Ltd., JP-10, saponification degree 88% by mol, polymerization degree 1000) and 5 parts by weight of glycerin.

Thereafter, a transfer layer was formed on the polyvinyl alcohol layer in the same manner as in Example 1, to produce a transfer sheet.

Comparative Example 13

A transfer sheet was produced according to the same method as in Comparative Example 12, except that a corona-discharge-treated polypropylene film (manufactured by Futamura Chemical Co., Ltd., FOH, thickness 50 μm) was used as a backing layer.

Comparative Example 14

As a backing layer, a release-treated PET film (manufactured by Unitika Ltd., FT-50, thickness 50 μm) was used.

On the backing layer, a polyvinyl alcohol layer was produced to a dry thickness of 15 μm by bar-coating using an aqueous solution of a resin composition constituted by the following at the following ratios: 100 parts by weight of PVA (manufactured by Japan Vam & Poval Co., Ltd., JP-10, saponification degree 88% by mol, polymerization degree 1000), 9 parts by weight of PEG 1540 as a diol compound, and 1 part by weight of polyoxypropylene glyceryl ether 300 as a triol compound whose adjacent hydroxyl groups are positioned at δ or farther positions with respect to each other.

Thereafter, a transfer layer was formed on the polyvinyl alcohol layer in the same manner as in Example 1, to produce a transfer sheet.

Comparative Example 15

A polyvinyl alcohol layer was produced to a dry thickness of 15 μm according to the casting method using an aqueous solution of a resin composition constituted by the following at the following ratios: 100 parts by weight of PVA (manufactured by Japan Vam & Poval Co., Ltd., JP-10, saponification degree 88% by mol, polymerization degree 1000), 5 parts by weight of PEG 1540 as a diol compound, and 5 parts by weight of polyoxypropylene glyceryl ether 300 as a triol compound whose adjacent hydroxyl groups are positioned at γ or farther positions with respect to each other.

Thereafter, a transfer layer was formed on the polyvinyl alcohol layer in the same manner as in Example 1, to produce a transfer sheet.

TABLE 1

|  | Backing layer | Saponification degree of PVA (% by mol) | Substances added to PVA layer and additive quantities | Transfer layer |
| --- | --- | --- | --- | --- |
| Example 1 | Untreated PET | 88 | PEG 1540 (9 parts by weight) Polyoxypropylene glyceryl ether 300 (1 part by weight) | Photocurable resin |
| Example 2 | Untreated PET | 88 | PEG 1540 (1 part by weight) Polyoxypropylene glyceryl ether 300 (9 parts by weight) | Photocurable resin |
| Example 3 | Untreated PET | 70 | PEG 1540 (5 parts by weight) Polyoxypropylene glyceryl ether 300 (5 parts by weight) | Photocurable resin |

TABLE 1-continued

| | Backing layer | Saponification degree of PVA (% by mol) | Substances added to PVA layer and additive quantities | Transfer layer |
|---|---|---|---|---|
| Example 4 | Untreated PET | 88 | PEG 1540 (5 parts by weight) Polyoxypropylene glyceryl ether 300 (5 parts by weight) | Metal film/adhesive layer |
| Example 5 | Corona-treated PET | 88 | PEG 1540 (5 parts by weight) Polyoxypropylene glyceryl ether 300 (5 parts by weight) | Metal film/adhesive layer |
| Example 6 | Untreated PET | 88 | PEG 400 (5 parts by weight) | Thermoplastic resin |
| Example 7 | Untreated PET | 88 | PEG 1000 (5 parts by weight) | Thermoplastic resin |
| Example 8 | Untreated PET | 88 | Trimethylene glycol (5 parts by weight) | Thermoplastic resin |
| Example 9 | Untreated PET | 88 | 2-methylpentane-2,4-diol (5 parts by weight) | Thermoplastic resin |
| Example 10 | Untreated PET | 88 | Polyoxypropylene glyceryl ether 300 (15 parts by weight) | Photocurable resin |
| Example 11 | Untreated PET | 70 | Polyoxypropylene glyceryl ether 300 (15 parts by weight) | Photocurable resin |
| Example 12 | Untreated PET | 70 | PEG 1540 (10 parts by weight) | Photocurable resin |
| Example 13 | Untreated PET | 70 | PEG 6000 (10 parts by weight) | Photocurable resin |
| Comparative Example 1 | Untreated PET | 88 | Glycerin (5 parts by weight) | Photocurable resin |
| Comparative Example 2 | Untreated PET | 88 | Trimethylolpropane (5 parts by weight) | Photocurable resin |
| Comparative Example 3 | Untreated PET | 88 | 1,2,6-hexanetriol (5 parts by weight) | Photocurable resin |
| Comparative Example 4 | Untreated PET | 88 | Diglycerin (5 parts by weight) | Photocurable resin |
| Comparative Example 5 | Untreated PET | 88 | Polyoxyethylene diglyceryl ether 450 (5 parts by weight) | Photocurable resin |
| Comparative Example 6 | Untreated PET | 88 | Sorbitol (5 parts by weight) | Photocurable resin |
| Comparative Example 7 | Untreated PET | 88 | PPG 400 (10 parts by weight) | Photocurable resin |
| Comparative Example 8 | Untreated PET | 88 | None | Photocurable resin |
| Comparative Example 9 | Release-treated PET | 88 | None | Photocurable resin |
| Comparative Example 10 | Corona-treated PET | 88 | None | Photocurable resin |
| Comparative Example 11 | Corona-treated PP | 88 | None | Photocurable resin |
| Comparative Example 12 | Release-treated PET | 88 | Glycerin (5 parts by weight) | Photocurable resin |
| Comparative Example 13 | Corona-treated PP | 88 | Glycerin (5 parts by weight) | Photocurable resin |
| Comparative Example 14 | Release-treated PET | 88 | PEG 1540 (9 parts by weight) Polyoxypropylene glyceryl ether 300 (1 part by weight) | Photocurable resin |
| Comparative Example 15 | None | 88 | PEG 1540 (5 parts by weight) Polyoxypropylene glyceryl ether 300 (5 parts by weight) | Photocurable resin |

<Transfer of Transfer Layer to Substrate>

The transfer sheets in Examples 1 to 13 and Comparative Examples 1 to 15 were pressure-treated for 5 minutes at 0.2 MPa using a precision heating/pressuring system (manufactured by Sintokogio, Ltd., CYPT-50) at each of temperatures 30° C., 80° C., and 130° C. with their transfer layer sides adhered to substrates, where 3-mm thick, 5-cm square polycarbonate sheets and 0.38-mm thick silicon wafers were used as the substrates. Next, the backing layers were peeled from the polyvinyl alcohol layers, and the polyvinyl alcohol layers were subsequently dissolved in pure water and removed, to transfer the transfer layers onto the substrates.

It should be noted that Table 2 lists only the results where the substrates were polycarbonate. However, in all examples the results of the evaluations below using the silicon wafers as the substrates were the same as those using the polycarbonate sheets.

<Evaluation of Transfer Layer Production Process>
(Evaluation A: T-Peel Strength Between Backing Layer and PVA Layer)

The transfer sheets in Examples 1 to 13 and Comparative Examples 1 to 14 were measured for T-peel strength between the backing layer and the PVA layer using a tensile tester (manufactured by MinebeaMitsumi, Inc., TG-5 kN) after humidity-adjusting the backing layer/PVA layer films prior to transfer layer production in an environment of 23° C., 50% RH.

(Evaluation B: Condition of Produced Transfer Sheet)

The transfer sheets in Examples 1 to 13 and Comparative Examples 1 to 15, each having a transfer layer formed thereon, were screened for appearance based on the criteria below:
  ○: There is no partial peeling between the backing layer and the PVA layer, and the transfer layer has no wrinkles.
  x: Partial peeling between the backing layer and the PVA layer caused bubbles to enter.
  x x: The transfer layer has wrinkles.

<Evaluation of Transfer Process>
(Evaluation C: Condition of Peeling of Backing Layer in Transfer Process)

The transfer sheets in Examples 1 to 13 and Comparative Examples 1 to 14 in the transfer process, each bonded to a substrate, were evaluated based on the criteria below for their condition in the process of adhering a piece of cellophane tape to the backing layer to create an initial peel point and then peeling the backing layer at 90°. If an initial peel point was not obtained, cuts were made with a cutting knife to peel the backing layer:

◎: Creating an initial peel point with the cellophane tape was easy and it was possible to make a clean peel.
○: Creating an initial peel point with the cellophane tape was difficult, but it was possible to make a clean peel.
x: An initial peel point was not obtained with the cellophane tape and the peeling left peel marks on the backing layer and PVA layer.

○: The PVA layer does not peel.
x: The PVA layer peels.

(Evaluation E: Condition of Transfer Layer in Transfer Process after Dissolution of PVA Layer in Water)

The condition of the transfer layer in the transfer process after the PVA layer had been dissolved in water, was evaluated based on the criteria below:

○: The transfer layer was transferred cleanly onto the substrate without bubble marks, peel marks, or wrinkle marks.
x: The transfer layer had bubble marks, peel marks, and/or wrinkle marks.

TABLE 2

| | Transfer layer production process Evaluation | | Transfer process (polycarbonate) | | | | | | | | |
|---|---|---|---|---|---|---|---|---|---|---|---|
| | | | Transfer process temperature 30° C. | | | Transfer process temperature 80° C. | | | Transfer process temperature 130° C. | | |
| | A (mN/20 mm) | Evaluation B | Evaluation C | Evaluation D | Evaluation E | Evaluation C | Evaluation D | Evaluation E | Evaluation C | Evaluation D | Evaluation E |
| Example 1 | 38 | ○ | ◎ | ○ | ○ | ◎ | ○ | ○ | ◎ | ○ | ○ |
| Example 2 | 70 | ○ | ◎ | ○ | ○ | ◎ | ○ | ○ | ◎ | ○ | ○ |
| Example 3 | 90 | ○ | ◎ | ○ | ○ | ◎ | ○ | ○ | ◎ | ○ | ○ |
| Example 4 | 42 | ○ | ◎ | ○ | ○ | ◎ | ○ | ○ | ◎ | ○ | ○ |
| Example 5 | 380 | ○ | ○ | ○ | ○ | ○ | ○ | ○ | ○ | ○ | ○ |
| Example 6 | 117 | ○ | ◎ | ○ | ○ | ○ | ○ | ○ | ○ | ○ | ○ |
| Example 7 | 48 | ○ | ◎ | ○ | ○ | ◎ | ○ | ○ | ◎ | ○ | ○ |
| Example 8 | 280 | ○ | ◎ | ○ | ○ | ○ | ○ | ○ | ○ | ○ | ○ |
| Example 9 | 120 | ○ | ◎ | ○ | ○ | ○ | ○ | ○ | ○ | ○ | ○ |
| Example 10 | 70 | ○ | ◎ | ○ | ○ | ◎ | ○ | ○ | ◎ | ○ | ○ |
| Example 11 | 110 | ○ | ◎ | ○ | ○ | ○ | ○ | ○ | ○ | ○ | ○ |
| Example 12 | 330 | ○ | ○ | ○ | ○ | ○ | ○ | ○ | ○ | ○ | ○ |
| Example 13 | 300 | ○ | ○ | ○ | ○ | ○ | ○ | ○ | ○ | ○ | ○ |
| Comparative Example 1 | 240 | ○ | X | ○ | X | X | ○ | X | X | ○ | X |
| Comparative Example 2 | 140 | ○ | X | ○ | X | X | ○ | X | X | ○ | X |
| Comparative Example 3 | 150 | ○ | X | ○ | X | X | ○ | X | X | ○ | X |
| Comparative Example 4 | 280 | ○ | X | ○ | X | X | ○ | X | X | ○ | X |
| Comparative Example 5 | 150 | ○ | X | ○ | X | X | ○ | X | X | ○ | X |
| Comparative Example 6 | 170 | ○ | X | ○ | X | X | ○ | X | X | ○ | X |
| Comparative Example 7 | 20 | X | ◎ | ○ | X | ◎ | ○ | X | ◎ | ○ | X |
| Comparative Example 8 | 67 | ○ | X | ○ | X | X | ○ | X | X | ○ | X |
| Comparative Example 9 | 20 | X | ◎ | ○ | X | ◎ | ○ | X | ◎ | ○ | X |
| Comparative Example 10 | 360 | ○ | X | ○ | X | X | ○ | X | X | ○ | X |
| Comparative Example 11 | 25 | X | X | ○ | X | X | ○ | X | X | ○ | X |
| Comparative Example 12 | 28 | X | ◎ | ○ | X | ◎ | ○ | X | ◎ | ○ | X |
| Comparative Example 13 | 25 | X | X | ○ | X | X | ○ | X | X | ○ | X |
| Comparative Example 14 | 26 | X | ◎ | ○ | X | ◎ | ○ | X | ◎ | ○ | X |
| Comparative Example 15 | — | XX | — | ○ | X | — | ○ | X | — | ○ | X |

(Evaluation D: Peel Property Between PVA Layer and Transfer Layer in Transfer Process)

After peeling off the backing layer in the transfer process, 2-cm square cuts were made from the PVA layer side using a cutting knife, and a piece of cellophane tape was adhered thereto and then peeled, to evaluate the peel property between the PVA layer and the transfer layer:

According to the Examples representing examples that conformed to the present invention, each evaluation produced a favorable result. In particular, favorable results were obtained under Evaluations C to E at all of the transfer process temperatures of 30° C., 80° C., and 130° C.

By contrast, Comparative Examples 1 to 6 and 8 that did not satisfy the requirement under the present invention regarding the composition of the polyvinyl alcohol layer 3, produced poor results under many of Evaluations C and E. Particularly in Comparative Example 3 that used 1,2,6-hexanetriol, favorable results could not be obtained because none of the hydroxyl groups were positioned at δ positions with respect to each other.

Comparative Example 7 that satisfied the requirement under the present invention regarding the composition of the polyvinyl alcohol layer 3, did not produce favorable results because the T-peel strength was under 30 mN/20 mm and thus partial peeling occurred between the backing layer 2 and the polyvinyl alcohol layer 3, creating bubble marks on the transfer layer 4.

In addition, Comparative Examples 9 and 10 that used a surface-treated PET layer and applied a polyvinyl alcohol layer containing nothing else, Comparative Example 11 that used a surface-treated polypropylene layer and applied a polyvinyl alcohol layer containing nothing else, Comparative Examples 12 and 13 that used a surface-treated PET layer or polypropylene layer and had a polyvinyl alcohol layer not satisfying the requirement under the present invention, and Comparative Example 14 that adopted a surface-treated PET layer and satisfied the requirement of the polyvinyl alcohol layer, but did not satisfy the T-peel strength, under the present invention, produced results similar to those of Comparative Examples 1 to 7.

Furthermore, in Comparative Example 15 that did not use a polyester layer, the result was poor under Evaluation B because there was no backing layer 2, and favorable results could not be achieved under Evaluation E, either.

According to the aforementioned results, adopting the transfer sheet 1 proposed by the present invention can facilitate transfer at normal temperature and under heating.

INDUSTRIAL FIELD OF APPLICATION

The transfer sheet proposed by the present invention allows not only pictures, but also photoresists and other curable resins, metal films, inorganic oxides, and other functional materials, to be transferred onto target substrates without leaving bubble marks or wrinkles, and under both normal temperature conditions and heating conditions. It can be utilized as a processing member for automotive components and electronic parts, metal surface processing, and other forming processes that utilize transfer.

What is claimed is:

1. A transfer sheet having a structure in which a polyester layer as a backing layer, a polyvinyl alcohol (PVA) layer, and a transfer layer, are stacked in this order, where the polyvinyl alcohol layer contains a triol compound whose adjacent hydroxyl groups are positioned at & or farther positions with respect to each other, the transfer sheet satisfying a condition in (i) below:
   (i) a T-peel strength at a peel rate of 100 mm/min between the polyester layer and the polyvinyl alcohol layer before a transfer layer is formed but after a humidity has been adjusted in an environment of 23° C., 50% RH, is 30 mN/20 mm or greater.

2. The transfer sheet according to claim 1, wherein the diol compound is a polyalkylene glycol of 1000 or greater in number-average molecular weight.

3. The transfer sheet according to claim 1, wherein a thickness of the polyvinyl alcohol layer is 5 to 100 μm.

4. The transfer sheet according to claim 1, wherein the polyester layer is not release-treated.

5. The transfer sheet according to claim 1, wherein the transfer layer is of at least one type selected from thermoplastic resin, metal film, and inorganic oxide.

6. The transfer sheet according to claim 1, wherein the transfer layer is a curable resin.

7. The transfer sheet according to claim 1, wherein the polyvinyl alcohol layer contains a diol compound.

8. The transfer sheet according to claim 7, wherein the diol compound is a polyalkylene glycol of 1000 or greater in number-average molecular weight.

9. The transfer sheet according to claim 7, wherein a thickness of the polyvinyl alcohol layer is 5 to 100 μm.

10. The transfer sheet according to claim 7, wherein the polyester layer is not release-treated.

11. The transfer sheet according to claim 7, wherein the transfer layer is of at least one type selected from thermoplastic resin, metal film, and inorganic oxide.

12. The transfer sheet according to claim 7, wherein the transfer layer is a curable resin.

13. A transfer method that comprises:
    bonding a transfer layer side of the transfer sheet according to claim 5 onto a surface of a flat or three-dimensionally shaped substrate;
    then peeling the polyester layer; and
    subsequently dissolving the polyvinyl alcohol layer in water and thus removing it, to form a transfer layer on the substrate surface.

14. A transfer method that comprises:
    after curing of the curable resin, bonding a transfer layer side of the transfer sheet according to claim 6 onto a surface of a flat or three-dimensionally shaped substrate;
    then peeling the polyester layer; and
    subsequently dissolving the polyvinyl alcohol layer in water and thus removing it, to form a transfer layer on the substrate surface.

15. A transfer method that comprises:
    bonding a transfer layer side of the transfer sheet according to claim 11 onto a surface of a flat or three-dimensionally shaped substrate;
    then peeling the polyester layer; and
    subsequently dissolving the polyvinyl alcohol layer in water and thus removing it, to form a transfer layer on the substrate surface.

16. A transfer method that comprises:
    after curing of the curable resin, bonding a transfer layer side of the transfer sheet according to claim 12 onto a surface of a flat or three-dimensionally shaped substrate;
    then peeling the polyester layer; and
    subsequently dissolving the polyvinyl alcohol layer in water and thus removing it, to form a transfer layer on the substrate surface.

* * * * *

UNITED STATES PATENT AND TRADEMARK OFFICE
CERTIFICATE OF CORRECTION

PATENT NO. : 12,214,618 B2
APPLICATION NO. : 17/617234
DATED : February 4, 2025
INVENTOR(S) : Shigenori Saito Page 1 of 1

It is certified that error appears in the above-identified patent and that said Letters Patent is hereby corrected as shown below:

In the Claims

At Column 19, Line 50, in Claim 1, the symbol "&" should be "δ".

Signed and Sealed this
Eighteenth Day of March, 2025

Coke Morgan Stewart
*Acting Director of the United States Patent and Trademark Office*